United States Patent [19]

Amick

[11] 4,402,378
[45] Sep. 6, 1983

[54] ENERGY-EFFICIENT MOTORCYCLE

[76] Inventor: James L. Amick, 1464 Cedar Bend Dr., Ann Arbor, Mich. 48105

[21] Appl. No.: 223,230

[22] Filed: Jan. 7, 1981

[51] Int. Cl.³ .............................................. B62D 35/00
[52] U.S. Cl. .................................. 180/210; 180/2 A; 180/903; 296/1 S
[58] Field of Search .............. 180/210, 2 A, 7 R, 903; 296/1 S; 244/36, 130, 2

[56] References Cited

U.S. PATENT DOCUMENTS

| | | | |
|---|---|---|---|
| D. 94,287 | 1/1935 | Taylor | 296/1 S |
| 3,804,428 | 4/1974 | Amick | 280/8 |
| 3,960,345 | 6/1976 | Lippert | 244/130 |
| 4,117,900 | 10/1978 | Amick | 296/1 S |

FOREIGN PATENT DOCUMENTS

| | | | |
|---|---|---|---|
| 915186 | 7/1949 | Fed. Rep. of Germany | 296/1 S |
| 761492 | 3/1954 | Fed. Rep. of Germany | 296/1 S |

*Primary Examiner*—John A. Pekar
*Attorney, Agent, or Firm*—Stephenson & Boller

[57] ABSTRACT

A three-wheeled vehicle (10) designed to provide practical transportation for one or two people at minimum energy cost, wherein the driver and passenger sit in tandem in a narrow enclosed fuselage (12). Steering is provided by a single front wheel (14), and a propulsion system drives the two rear wheels (16). Vertical airfoils or fins (20) enclose and streamline the upper portions of the rear wheels, while providing the vehicle with aerodynamic stability and forward thrust in a crosswind. Horizontal struts (18) connect the fuselage with the vertical fin-wheel assemblies. The juncture between struts and fuselage are faired with concave fillets (22) which enlarge toward the rear, and terminate in a surface (26) perpendicular to the longitudinal axis. The fillets reduce vehicle drag by preventing flow separation. Aerodynamic drag of the vehicle is about one-sixth that of typical subcompact cars, and its aerodynamic stability keeps it on course in crosswinds, despite being less than half as heavy.

4 Claims, 4 Drawing Figures

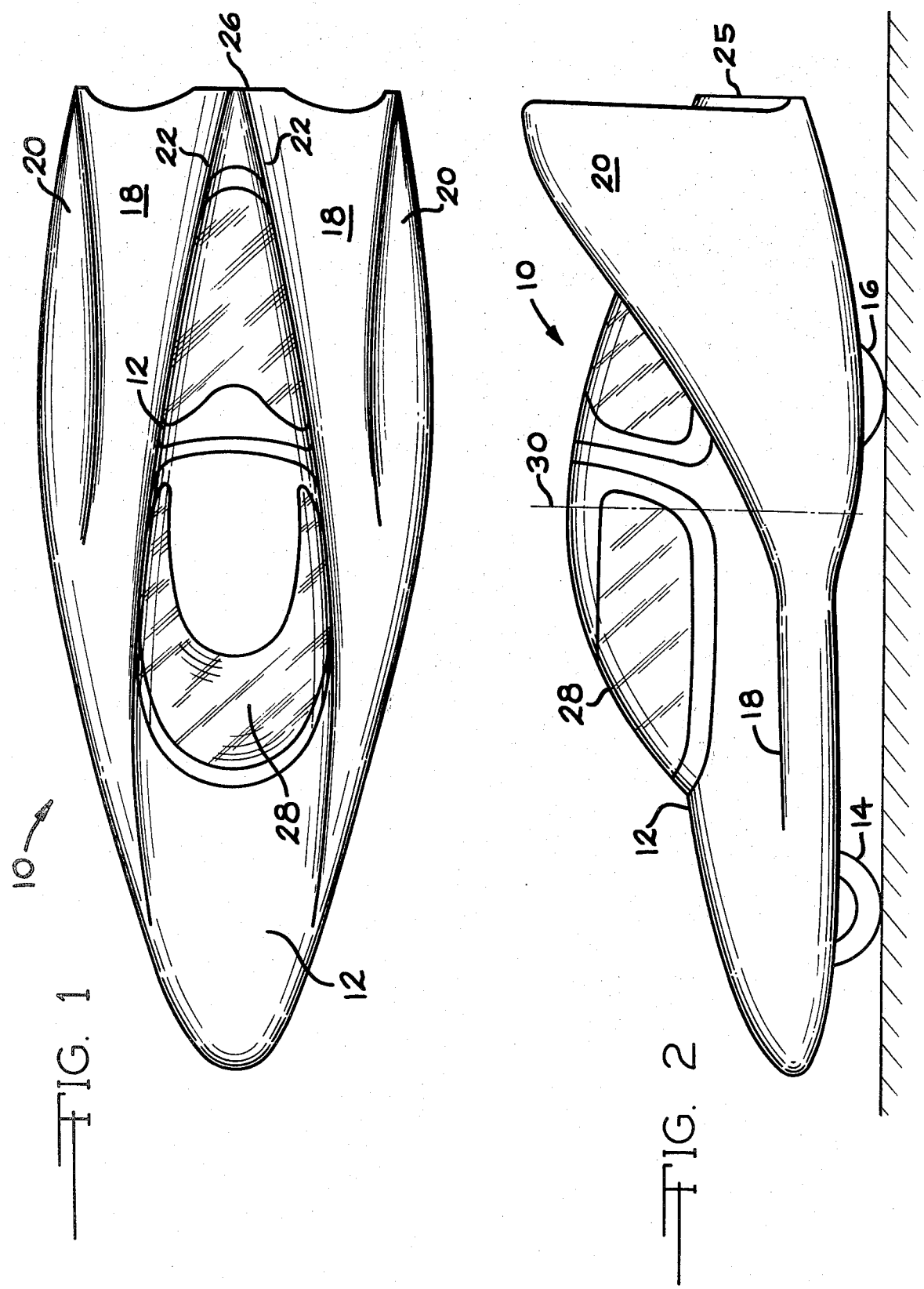

ENERGY-EFFICIENT MOTORCYCLE

BACKGROUND OF THE INVENTION

The present invention relates to self-propelled vehicles which are adapted to utilize wind power as a second source of energy for propulsion purposes.

It is recognized that the modern automobile is in need of significant changes to reduce substantially its requirement for fuel. Various efforts in this direction have been undertaken, such as providing three-wheeled arrangements which save weight and rolling resistance compared with vehicles having four wheels; utilizing narrow vehicle bodies seating two people in tandem so as to reduce drag by reducing the frontal area of the vehicle; utilizing vertical airfoils or fins to provide forward thrust in the presence of a crosswind. These concepts are known in the prior art and are disclosed, for example, in U.S. Pat. No. 4,117,900, patented Oct. 3, 1978 in the name of Amick. However, further advancements are still required to meet the needs of the public for energy-efficient vehicles that have optimum dimensions and driving performance commensurate with lower fuel consumption.

Conventional automobiles with four wheels are to some extent inherently unstable in crosswinds, and this problem becomes more acute when steps are taken to reduce the weight of the vehicles in the interest of fuel economy. Similarly, aerodynamic drag of conventional automobiles is substantially greater than desirable and is a factor contributing to these vehicles having a higher fuel consumption than is necessary. Vehicles such as are disclosed in U.S. Pat. No. 4,117,900 have light weight characteristics and have design characteristics which materially reduced the aerodynamic drag when compared with conventional automobiles, but further advancements are required. In particular, there is still a need for improvements in conventional automobiles or in vehicles of the type disclosed in the aforesaid patent, wherein the vehicles can be made very light in weight and still have good steering characteristics in a crosswind and on slippery roads, and wherein the vehicles also are constructed to avoid extending the overall lengths excessively for the purpose of minimizing drag.

Recent wind-tunnel tests of a model of an energy-efficient motorcycle of a desirable length designed according to the principles of the aforesaid patent revealed a flow separation problem. The energy-efficient motorcycle model that was tested consisted of a streamlined fuselage containing a single nose wheel, with horizontal struts extending laterally from both sides of the fuselage to rear wheels partially enclosed within the lower portions of vertical airfoils or fins.

The wind tunnel tests of this configuration revealed boundary-layer separation on the rear part of the fuselage, due to the adverse pressure gradient field of the rear part of each vertical airfoil combining with that of the adjacent fuselage. This interference between vertical airfoil and fuselage occurred because of their relative proximity compared with the airfoil size, in this configuration.

Boundary-layer separation is undesirable since it results in a significant increase in drag. The airfoil boundary layer did not separate when the fuselage boundary layer did, even though the airfoil boundary layer is exposed to nearly the same adverse pressure gradient, because it is thinner, having developed over a shorter distance. Thus, there is a need for further advancement in the art if greater fuel economy is to be realized.

SUMMARY OF THE INVENTION

The present invention has overcome the inadequacies of the prior art and provides an energy-efficient vehicle that meets the needs set forth above.

In connection with the problems that arose with the test model, it has been discovered that the fuselage boundary-layer separation can be eliminated by adding a large fillet (concave fairing) in the intersection of each horizontal strut with the fuselage. Each fillet is small in the region where the vertical airfoil comes closest to the fuselage, and increases in size with distance rearward, reaching a maximum size at the rear end of the vehicle, and terminating abruptly in a flat vertical surface perpendicular to the direction of motion. Longitudinal sections through each fillet have a slightly convex shape.

The first fillets that were tried were of insufficient size to completely eliminate boundary-layer separation. They had a total base area of 2 percent of the model frontal area. When their total base area was enlarged to 6 percent of the frontal area, smooth attached flow was obtained. Had the vertical airfoils been farther from the fuselage, smaller fillets would have sufficed. In the test model the vertical airfoils were each spaced from the fuselage a distance corresponding to rear wheel spacing of a conventional automobile.

Fillets such as those used on this invention are commonly used on airplanes in wing-fuselage junctures, but they always terminate in sharp trailing edges. Blunt bases are undesirable because they add extra drag.

The blunt-based fillets as used in the present invention are unique. In this case the blunt base was adopted to avoid extending the overall length of the vehicle. Before the blunt-based fillets were tried, it was not known if the reduction in drag due to eliminating boundary-layer separation would be enough to overcome the added drag due to the blunt base. The wind-tunnel tests showed that there was indeed a net reduction in drag, that amounted to about twelve percent in this particular case.

The present invention combines the principles of U.S. Pat. No. 4,117,900 with the use of blunt-based fillets, to define a two-place vehicle having minimum energy requirements while meeting other requirements of length and maneuverability. The blunt-based fillets provide a significant improvement in the air flow along the rear sides of the fuselage, and a net reduction in drag.

In one form of the invention, a narrow fuselage with single nose wheel is supported at the rear by two wheels connected to the fuselage by horizontal struts. The narrow fuselage seats two people in tandem, thus minimizing wind resistance by reducing frontal area. The horizontal struts allow the rear wheels to be sufficiently far apart to prevent overturning in extreme cornering maneuvers. Vertical airfoils enclose the upper parts of the rear wheels and extend upward and rearward enough to insure aerodynamic stability by bringing the center of aerodynamic side force rearward of the vehicle's center of gravity. The junctures between fuselage and horizontal struts, instead of being right-angled interior corners, are filled in with concave fillets, beginning near each point of closest approach of a vertical airfoil to the fuselage and extending rearward with increasing size to a blunt base at the aft end of the fuselage. The fillets are sized sufficiently large to prevent separation of the fuselage boundary layer.

Thus, a primary object of this invention is to provide an energy-efficient motorcycle that will carry two people in comfort and safety, with minimum energy requirements.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a top plan view of a three-wheeled vehicle embodying the present invention;

FIG. 2 is a side elevational view thereof;

DESCRIPTION OF THE PREFERRED EMBODIMENT

Figure 3:
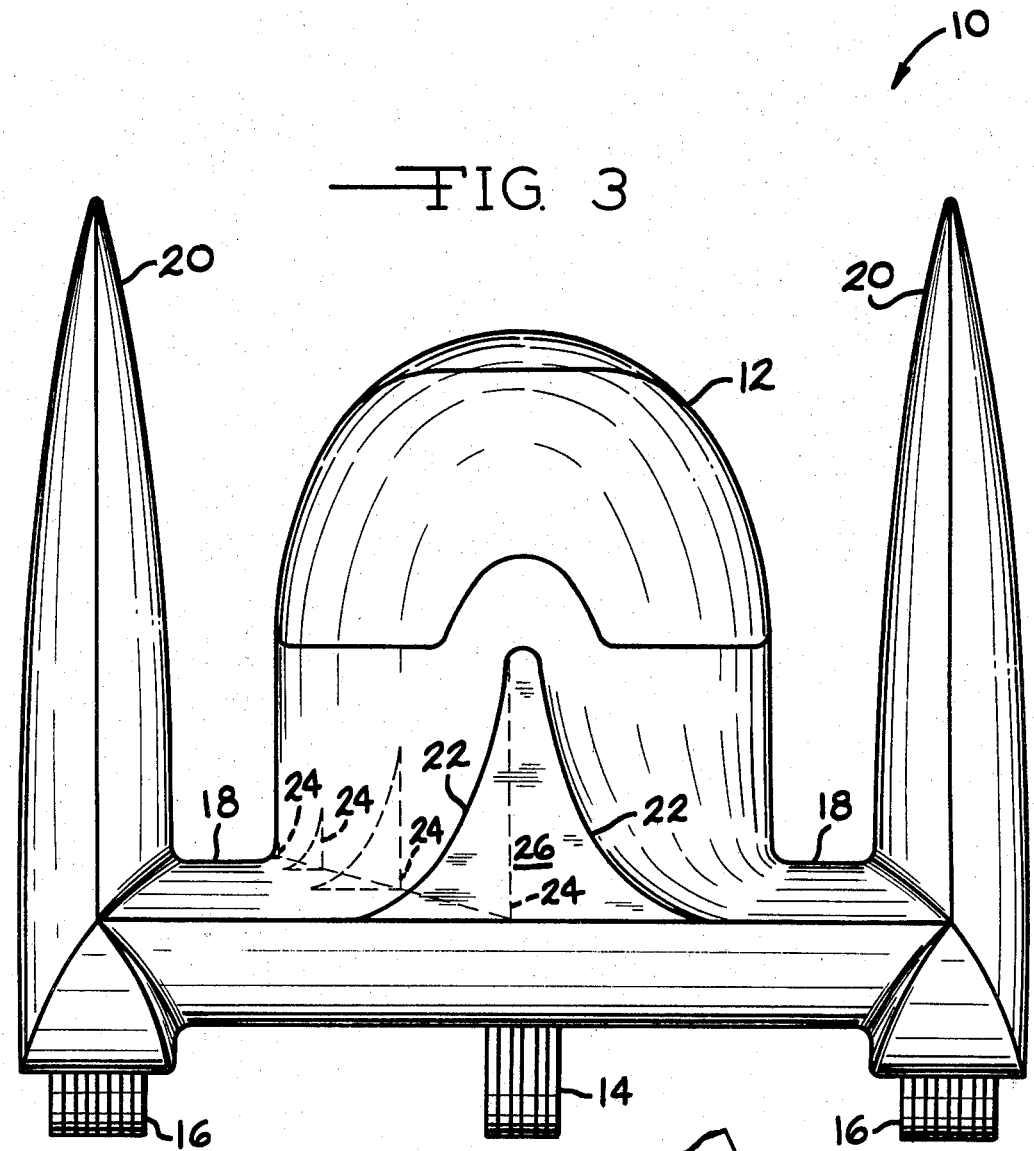
FIG. 3 is an enlarged rear elevational view thereof.
Figure 4:
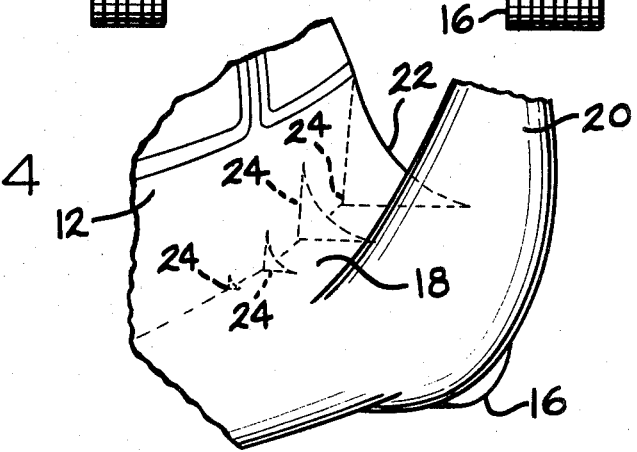
FIG. 4 is a fragmentary front perspective view of the left rear portion of the vehicle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The energy-efficient motorcycle or vehicle 10 has a streamlined fuselage 12 equipped with single nose wheel 14 and supported at the rear by two main or rear wheels 16, which are connected to the fuselage by horizontal struts 18. Vertical airfoils 20 enclose the upper parts of main wheels 16. Blunt-based fillets 22 fill in the aft parts of the right-angled interior corners 24 between fuselage and horizontal struts, beginning where the channel between fuselage and vertical airfoil is narrowest, and increasing in cross sectional area with distance rearward, terminating in the blunt base 26. The driver occupies the front seat (not shown) of an enclosed cockpit 28, with a second seat (not shown) for a passenger behind the driver's seat. As seen in the drawings, a front wrap-around windshield provides a view throughout a horizontal arc of 240 degrees and a full rear window is also provided.

The features described above enable this vehicle 10 to carry two people in comfort and safety, and yet the vehicle has only about one-sixth the aerodynamic drag of a typical 4-passenger subcompact automobile. The narrow fuselage 12 with its tandem seating arrangement minimizes wind resistance by reducing frontal area. The narrowness of the fuselage 12 is made possible by the horizontal struts 18, which place the rear wheels 16 far enough apart, approximately as in conventional four-wheeled automobiles, to provide complete stability against overturning. The vertical airfoils 20 give forward propulsive forces when a crosswind is present. The large blunt-based fillets 22 prevent separation that would otherwise increase the aerodynamic drag.

The energy-efficiency of this vehicle is also enhanced by its very light weight, less than half the weight of the lightest 4-passenger automobile. The vertical airfoils stabilize this vehicle in the presence of crosswind disturbances, keeping it on course despite its light weight.

The height of the vertical airfoils has an important effect on the position of the center of lateral aerodynamic forces in a crosswind. In the airfoil tips are located at a height above ground equal to three-fourths of the wheelbase, then the distance from the center of lateral aerodynamic forces to the rear axle station (not shown) will be less than 22 percent of the wheelbase, for all relative wind angles less than 25 degrees. Thus, for this airfoil height, a center of gravity location 22 percent of the wheelbase ahead of the rear axle station, as indicated by the broken line 30 in FIG. 2, gives aerodynamic stability for crosswinds up to 24 mph, at a vehicle speed of 55 mph. At crosswinds above this magnitude some instability may be noted, but less than that which would be present in a conventional automobile exposed to the same crosswind. To provide a center of gravity approximately at the line 30, the propulsion engine (not shown) is suitably mounted adjacent to the rear wheels 16 in driving connection with the rear axle (not shown).

This vehicle has several other advantageous features beside its energy-efficiency. The narrow nose and wedge-shaped plan form of the horizontal struts make the vehicle extremely crash-worthy, causing it to glance off obstacles that are not encountered exactly head-on. The horizontal struts also protect the occupants from side impacts to a much greater extent than do the doors of conventional cars.

Collision avoidance is favored by the excellent forward vision enjoyed by the driver, since there are no windshield pillars nor passengers to obstruct his view anywhere throughout a horizontal arc of 240 degrees. Because he is seated on the centerline of the vehicle, the driver can easily steer an optimum course between obstacles. When a stretch of slippery road is encountered, the vertical airfoils keep the vehicle pointing straight ahead, rather than spinning around as do conventional automobiles, with their inherent aerodynamic instability.

With its center of gravity only 22 percent of the wheelbase ahead of the rear axle station, the vehicle has 78 percent of its weight on the powered wheels. This gives it better traction in snow and mud than even the front-wheel-drive automobiles, which generally have less than 65 percent of their weight on the powered wheels.

Parking is especially easy with this vehicle. It can make a U-turn between curbs only twenty feet apart.

The size of the blunt-based fillets required to prevent flow separation on the fuselage may be reduced by toeing-out the vertical airfoils, so that their leading edges are farther apart than are their trailing edges.

Smaller blunt-based fillets in the junctures between vertical airfoils and horizontal struts can also contribute to drag reduction. Driver vision to the rear can be enhanced by constructing a portion of each vertical airfoil from a transparent material such as polycarbonate plastic.

What is claimed:

1. An energy-efficient vehicle comprising a streamlined body supported by front and rear wheels, streamlined struts extending outwardly from said body to said rear wheels, vertical airfoils enclosing the upper portions of said rear wheels and extending upwardly and rearwardly to provide aerodynamic stability, and fillets in the junctures between said body and said struts for prevention of flow separation, each of said fillets terminating rearwardly in a blunt base generally perpendicular to the flow direction.

2. An energy-efficient motorcycle as in claim 1, wherein said body is supported in the front by a single wheel.

3. An energy-efficient motorcycle as in claim 2, wherein said struts begin near the nose of said body, and increase rearwardly in width until said rear wheels are reached.

4. An energy-efficient vehicle as in claim 1, wherein said fillets begin near the point of closest proximity of said airfoils to said body, and increase rearwardly in size.

* * * * *